(12) United States Patent
Gordon et al.

(10) Patent No.: US 10,664,908 B1
(45) Date of Patent: May 26, 2020

(54) SYSTEMS AND METHODS FOR ADJUSTING THE VALUE OF DISTRESSED PROPERTIES

(71) Applicant: FEDERAL HOME LOAN MORTGAGE CORPORATION (FREDDIE MAC), McLean, VA (US)

(72) Inventors: James Douglas Gordon, Arlington, VA (US); Pamela W. Sims, Cary, NC (US); Aohua Chen, Herndon, VA (US); Michael G. Bradley, Chesterfield, MO (US)

(73) Assignee: FEDERAL HOME LOAN MORTGAGE CORPORATION (FREDDIE MAC), McLean, VA (US)

( * ) Notice: Subject to any disclaimer, the term of this patent is extended or adjusted under 35 U.S.C. 154(b) by 303 days.

(21) Appl. No.: 15/723,017

(22) Filed: Oct. 2, 2017

Related U.S. Application Data

(63) Continuation of application No. 14/108,153, filed on Dec. 16, 2013, now Pat. No. 9,779,453, which is a continuation of application No. 13/767,386, filed on Feb. 14, 2013, now Pat. No. 8,612,358, which is a continuation of application No. 11/116,325, filed on Apr. 28, 2005, now Pat. No. 8,386,395.

(51) Int. Cl.
*G06Q 30/00* (2012.01)
*G06Q 40/02* (2012.01)

(52) U.S. Cl.
CPC .................... *G06Q 40/025* (2013.01)

(58) Field of Classification Search
None
See application file for complete search history.

(56) References Cited

U.S. PATENT DOCUMENTS

| | | | | | |
|---|---|---|---|---|---|
| 5,361,201 A | * | 11/1994 | Jost | ................ | G06Q 40/00 705/35 |
| 5,414,621 A | * | 5/1995 | Hough | ............... | G06Q 30/0205 705/38 |
| 5,680,305 A | * | 10/1997 | Apgar, IV | .......... | G06Q 10/0635 705/7.28 |
| 5,857,174 A | * | 1/1999 | Dugan | ................... | G06Q 30/06 705/313 |
| 5,930,775 A | * | 7/1999 | McCauley | ............. | G06Q 40/00 705/35 |
| 6,115,694 A | * | 9/2000 | Cheetham | ............... | G06Q 30/06 705/7.35 |
| 6,178,406 B1 | * | 1/2001 | Cheetham | ........ | G06Q 10/06375 705/7.34 |

(Continued)

OTHER PUBLICATIONS www/cswv.com/products/redex/correction, Default Correction Factors (date visited May 25, 2005) (2 pgs.).

(Continued)

*Primary Examiner* — Matthew T Sittner
(74) *Attorney, Agent, or Firm* — Finnegan, Henderson, Farabow, Garrett & Dunner LLP

(57) ABSTRACT

Systems and methods are provided for providing an adjustment to a value estimate for a property that is considered distressed. In one embodiment, a method includes receiving the estimate of value for the property; determining, based on a model, the adjustment to the estimate of value, such that the model accounts for a characteristic of the property and a characteristic of the loan; and providing the adjustment.

27 Claims, 6 Drawing Sheets

(56) References Cited

U.S. PATENT DOCUMENTS

| | | | | |
|---|---|---|---|---|
| 6,401,070 B1* | 6/2002 | McManus | G06Q 30/06 | 705/313 |
| 6,609,109 B1* | 8/2003 | Bradley | G06Q 40/00 | 705/35 |
| 6,609,118 B1* | 8/2003 | Khedkar | G06Q 10/10 | 705/27.1 |
| 6,748,369 B2* | 6/2004 | Khedkar | G06N 5/048 | 706/6 |
| 6,834,120 B1* | 12/2004 | LeClerc | G06K 9/6212 | 345/694 |
| 6,842,738 B1* | 1/2005 | Bradley | G06Q 30/0202 | 705/1.1 |
| 6,876,955 B1* | 4/2005 | Fleming | G06Q 30/06 | 702/181 |
| 7,130,810 B2* | 10/2006 | Foster | G06Q 10/06375 | 705/80 |
| 7,249,089 B2* | 7/2007 | Mendizabal | G06Q 30/08 | 705/37 |
| 7,249,146 B2* | 7/2007 | Brecher | G06Q 30/06 | |
| 7,289,965 B1* | 10/2007 | Bradley | G06Q 30/00 | 705/306 |
| 7,305,328 B1* | 12/2007 | Fleming | G06Q 30/06 | 702/181 |
| 7,340,431 B1* | 3/2008 | McManus | G06Q 40/06 | 705/15 |
| 7,693,764 B1* | 4/2010 | Gordon | G06Q 20/10 | 705/35 |
| 7,693,782 B1* | 4/2010 | Stricker | G06Q 40/00 | 705/35 |
| 7,711,574 B1* | 5/2010 | Bradley | G06Q 30/02 | 705/306 |
| 8,386,395 B1* | 2/2013 | Gordon | G06Q 40/025 | 705/313 |
| 2001/0039506 A1* | 11/2001 | Robbins | G06Q 10/06 | 705/7.34 |
| 2001/0047327 A1* | 11/2001 | Courtney | G06Q 20/108 | 705/38 |
| 2002/0035520 A1* | 3/2002 | Weiss | G06Q 30/0625 | 705/26.62 |
| 2002/0087389 A1* | 7/2002 | Sklarz | G06Q 30/02 | 705/7.34 |
| 2002/0099650 A1* | 7/2002 | Cole | G06Q 30/02 | 705/38 |
| 2002/0128956 A1* | 9/2002 | Mendizabal | G06Q 30/08 | 705/37 |
| 2003/0036922 A1* | 2/2003 | Fries | G06Q 10/10 | 705/316 |
| 2003/0110122 A1* | 6/2003 | Nalebuff | G06Q 40/02 | 705/38 |
| 2003/0149658 A1* | 8/2003 | Rossbach | G06Q 40/02 | 705/38 |
| 2003/0212565 A1* | 11/2003 | Badali | G06Q 30/02 | 705/306 |
| 2004/0019517 A1* | 1/2004 | Sennott | G06Q 10/10 | 705/313 |
| 2004/0059653 A1* | 3/2004 | Verkuylen | G06Q 40/00 | 705/35 |
| 2004/0153330 A1* | 8/2004 | Miller | G06Q 40/025 | 705/38 |
| 2004/0243507 A1* | 12/2004 | Deane | G06Q 30/08 | 705/38 |
| 2004/0254803 A1* | 12/2004 | Myr | G06Q 10/04 | 705/306 |
| 2005/0171822 A1* | 8/2005 | Cagan | G06Q 40/02 | 705/36 R |
| 2005/0209872 A1* | 9/2005 | Szymanski | G06Q 10/10 | 705/1.1 |
| 2005/0262016 A1* | 11/2005 | Hill | G06Q 20/10 | 705/39 |
| 2005/0278246 A1* | 12/2005 | Friedman | G06Q 40/025 | 705/38 |
| 2005/0288942 A1* | 12/2005 | Graboske | G06Q 30/0278 | 705/35 |
| 2006/0059073 A1* | 3/2006 | Walzak | G06Q 40/00 | 705/35 |
| 2006/0085207 A1* | 4/2006 | Carey | G06Q 10/00 | 705/306 |
| 2006/0085234 A1* | 4/2006 | Cagan | G06F 17/18 | 705/313 |
| 2006/0122918 A1* | 6/2006 | Graboske | G06Q 10/10 | 705/30 |
| 2006/0242057 A1* | 10/2006 | Velarde | G06Q 40/02 | 705/38 |
| 2006/0293987 A1* | 12/2006 | Shapiro | G06Q 40/00 | 705/35 |
| 2007/0005373 A1* | 1/2007 | Villena | G06Q 30/02 | 705/306 |
| 2007/0033126 A1* | 2/2007 | Cagan | G06Q 40/00 | 705/35 |

OTHER PUBLICATIONS

Econometric Methods, J. Johnston, 3$^{rd}$ Edition. 1984, cover page, table of contents, and pp. 171-174.

www.freddiemac.com, Freddie Mac's Home Value Explorer (date visited May 25, 2005) (1 pg.).

www.freddiemac.com, Metrics Matter, Douglas Gordon (dated visited May 25, 2005) (3 pgs.).

www.freddiemac.com, Home Value Explorer (dated visited May 25, 2005) (2pgs.).

U.S. Appl. No. 09/728,061, filed Dec. 4, 2000 (unpublished).

U.S. Appl. No. 10/679,516, filed Oct. 7, 2003 (unpublished).

* cited by examiner

SYSTEMS AND METHODS FOR ADJUSTING THE VALUE OF DISTRESSED PROPERTIES

This application is a continuation of U.S. patent application Ser. No. 14/108,153, filed Dec. 16, 2013, which is a continuation of U.S. patent application Ser. No. 13/767,386, filed Feb. 14, 2013 (issued as U.S. Pat. No. 8,612,358), which is a continuation of U.S. patent application Ser. No. 11/116,325, filed Apr. 28, 2005 (issued as U.S. Pat. No. 8,386,395). The content of each of the above-referenced applications is expressly incorporated herein by reference in its entirety.

BACKGROUND OF THE INVENTION

I. Field of the Invention

The present invention generally relates to financial systems and to systems and methods for processing financial information. More particularly, the invention relates to systems and methods for determining value adjustments to properties securing mortgage loans that are delinquent or have been subject to a foreclosure.

II. Background and Material Information

When a borrower is late in making mortgage payments or the mortgage is in default, an entity with an interest in the mortgage, such as a lender, may act to protect its investment. Since the value of the property securing the mortgage is often maximized by keeping the borrower in place, the lender may want to assist the borrower. If the mortgage is in default and the lender has foreclosed on the mortgaged property and taken possession of the property (referred to as real estate owned or RED), the lender may want to sell the property as quickly as possible. In either of these scenarios, the lender may have an interest in determining the value of the property.

A property is considered distressed when the property is in a foreclosure status or in a delinquent status. Specifically, a distressed property is considered to be in a foreclosure status when the property securing a mortgage loan has been through foreclosure resulting in the real estate being owned by an entity such as the lender. For example, the foreclosure property is transferred from the —homeowner to another entity, such as a lender, servicer, or insurer, and then becomes REO. The distressed property is considered to be in a delinquent status when the corresponding mortgage loan has late mortgage payments. In some cases, if the mortgage payments have been chronically late (e.g., 3 or more late mortgage payments or nearing foreclosure), the mortgage is considered "seriously" delinquent. When a property securing a mortgage is considered "distressed," a lender may want to adjust the value of the property on its books to reflect the lower market value typical for such properties. For example, in the case of a foreclosed loan with the property in REO inventory, the lender might calculate an appropriate adjustment by finding a property comparable to the REO property and its value, and then discounting the value of the comparable property by a flat percentage, e.g., 10%, to account for the foreclosure. The flat percentage discount, an adjustment used by some lenders, produces a relatively inaccurate estimate of value. Alternatively, the lender may obtain an appraisal of the property's value from an in-person appraiser. But, this option is expensive, costing several hundred dollars, and time consuming, taking days or weeks. In the case of delinquent mortgage payments, a lender may use the value of a comparable property to help determine whether to modify the borrower's mortgage terms to assist the borrower to retain the mortgaged property. Or, similar to the REO case, the lender may perform a flat value adjustment of, say, 10% for any property securing a seriously delinquent loan. Again, a flat percentage discount will be relatively inaccurate and the services of an in-person appraiser will be relatively expensive and time consuming.

As noted above, in both the foreclosure and delinquent cases, a lender may use the value of a comparable property in assessing the value of the distressed property. The value of a comparable property is a form of an appraisal. An appraisal provides a property value estimate indicating the market value for the property. The appraisal may be performed in various ways including, for example, an in-person property appraisal performed by an appraiser. During the in-person appraisal, the appraiser physically inspects the property. Another form of valuation is a broker price opinion (BPO) performed by a real estate broker. Alternatively, an automated valuation model serves as a tool that utilizes various factors (e.g., ZIP code, lot size, number of bedrooms, prior sales information, etc.) to appraise a property. Examples of automated valuation models (AVM) may be found in one or more of the following applications, all of which are hereby incorporated by reference in their entirety: U.S. patent application Ser. No. 08/730,289, filed on Oct. 11, 1996, entitled "METHOD FOR COMBINING HOUSE PRICE FORECASTS" (now U.S. Pat. No. 6,609,109); U.S. patent application Ser. No. 09/115,831, filed on Jul. 15, 1998, entitled "SYSTEM AND METHOD FOR PROVIDING HOUSE PRICE FORECASTS BASED ON REPEAT SALES MODEL" (now U.S. Pat. No. 6,401,070); U.S. patent application Ser. No. 09/134,161, filed on Aug. 14, 1998, entitled "SYSTEM AND METHOD FOR PROVIDING PROPERTY VALUE ESTIMATES" (now U.S. Pat. No. 6,842,738); and U.S. patent application Ser. No. 09/728, 061, filed on Dec. 4, 2000, entitled "METHOD FOR FORECASTING HOUSE PRICES USING A DYNAMIC ERROR CORRECTION MODEL". Other types of appraisals that provide an estimate of property value may also be used to —appraise a property. For example, Freddie Mac's Home Value Explorer provides an automated home valuation when the user submits the address of a property.

SUMMARY OF THE INVENTION

The present invention is directed to systems and methods for processing financial information and, more particularly, systems and methods for using property and financial information for determining value adjustments to properties securing mortgage loans that are delinquent or have been subject to foreclosure.

One embodiment consistent with the present invention provides systems and methods for providing an adjustment to an estimate of value for a property that is considered distressed. Moreover, the systems and methods may receive the estimate of value for the property. Furthermore, the systems and methods may determine, based on a model, the adjustment to the estimate of value, such that the model accounts for a characteristic of the property and a characteristic of the loan. In addition, the systems and methods may provide the adjustment.

Another embodiment consistent with the present invention provides systems and methods for providing an adjustment to an estimate of value for a property that is considered distressed. Moreover, the systems and methods may receive the estimate of value for the property. Furthermore, the systems and methods may determine, when the property is in a foreclosure status, the adjustment based on a first model, such that the first model accounts for a characteristic of the property and the foreclosure status. In addition, the systems and methods may determine, when the property is in a delinquent status, the adjustment based on a second model, such that the second model accounts for the characteristics of the property and the loan.

Additional features and advantages of the invention will be set forth in part in the following description or may be learned by practice of the invention. The objectives and advantages of the invention may be realized and attained by the system and method particularly described in the written description and claims hereof as well as the appended drawings.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings, which constitute a part of this specification, illustrate various embodiments and aspects of the present invention and, together with the description, explain the principles of the invention. In the drawings.

DETAILED DESCRIPTION

Reference will now be made in detail to the invention, examples of which are illustrated in the accompanying drawings. Wherever possible, the same reference numbers will be used throughout the drawings to refer to the same or like parts.

Systems and methods consistent with the present invention permit a lender, using a computing platform (or computer), to obtain an adjusted value for a mortgaged property that has been foreclosed or on which the mortgage payments are delinquent. The more accurate value due to the adjustment may be used by the lender as a basis for modifying the mortgage terms in the case of delinquent payments. In the case of a foreclosed property, the lender may use the adjusted value to help determine a sales price for the property. In one embodiment of the invention, a computer may receive an estimate of value for the property. Moreover, the computer may determine, based on a model, the adjustment to the estimate of value, such that the model accounts for a characteristic of the property and a characteristic of the loan. The computer may then provide the adjustment.

Figure 1:
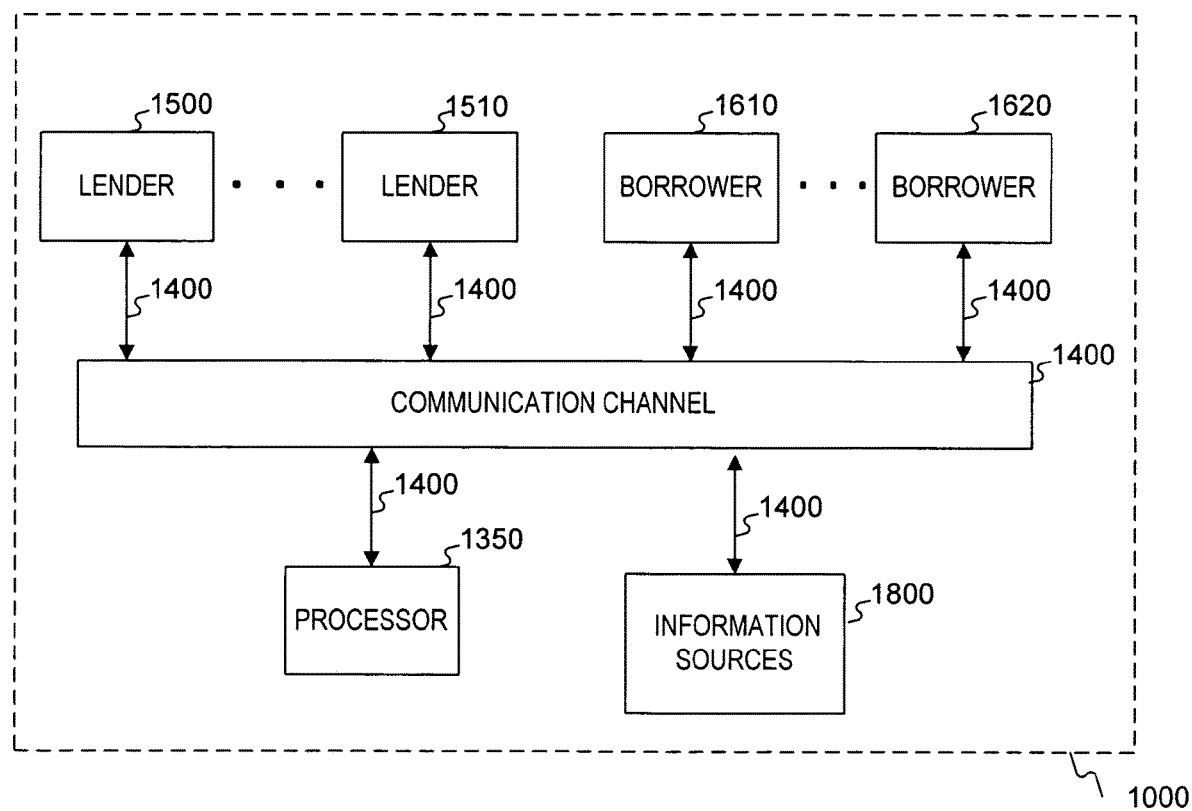
FIG. 1 depicts a block diagram of an exemplary system consistent with the systems and methods of the present invention.

FIG. 1 shows an exemplary system 1000 for providing an adjusted value for a property that is either in a foreclosure status or in a delinquent status. As used herein, the terms "mortgage," "loan," and "mortgage loan" are used interchangeably since mortgage is a type of loan secured by real property. As used herein, the terms "property" and "home" are used interchangeably to refer to a property securing a mortgage. Referring to FIG. 1, system 1000 includes a communication channel 1400, one or more lenders 1500, 1510, one or more borrowers 1610, 1620, one or more information sources 1800, and a processor 1350.

The one or more lenders 1500, 1510 may include a financial entity, such as a bank, mortgage bank, or mortgage note holder. Although FIG. 1 refers to "lenders," any of the following entities may determine an adjustment consistent with the systems and methods described herein: a mortgage servicer, mortgage insurer, mortgage broker, mortgage originator, collection agency, representative of the financial entity, and/or individual. The one or more borrowers 1610, 1620 may include an entity, such as a homeowner, with a mortgage loan. The information sources 1800 may include internal, external, proprietary, and/or public databases, such as property databases, financial databases, and demographic databases. Moreover, information sources 1800 may include information received from an automated valuation model (AVM) that provides estimates of home or property values, such as Freddie Mac's Home Value Explorer. The processor 1350 may include an entity (or the entity's computer) capable of processing information (e.g., amount indicative of the value of a property), determining a value adjustment for the property (now considered distressed), and then providing the adjustment, so that a lender may decide whether to adjust the sales price of the distressed property that is in foreclosure or adjust the terms of the mortgage associated with the distressed property.

As used herein, the term "foreclosure" means a legal proceeding that bars or extinguishes a mortgagor's (borrower) right of redeeming a mortgaged property (with the phrase "in foreclosure" having the same meaning as "foreclosure"). Real Estate Owned (REO) are properties now owned by an entity, such as a lender, who has acquired the properties through foreclosure proceedings.

Figure 2:
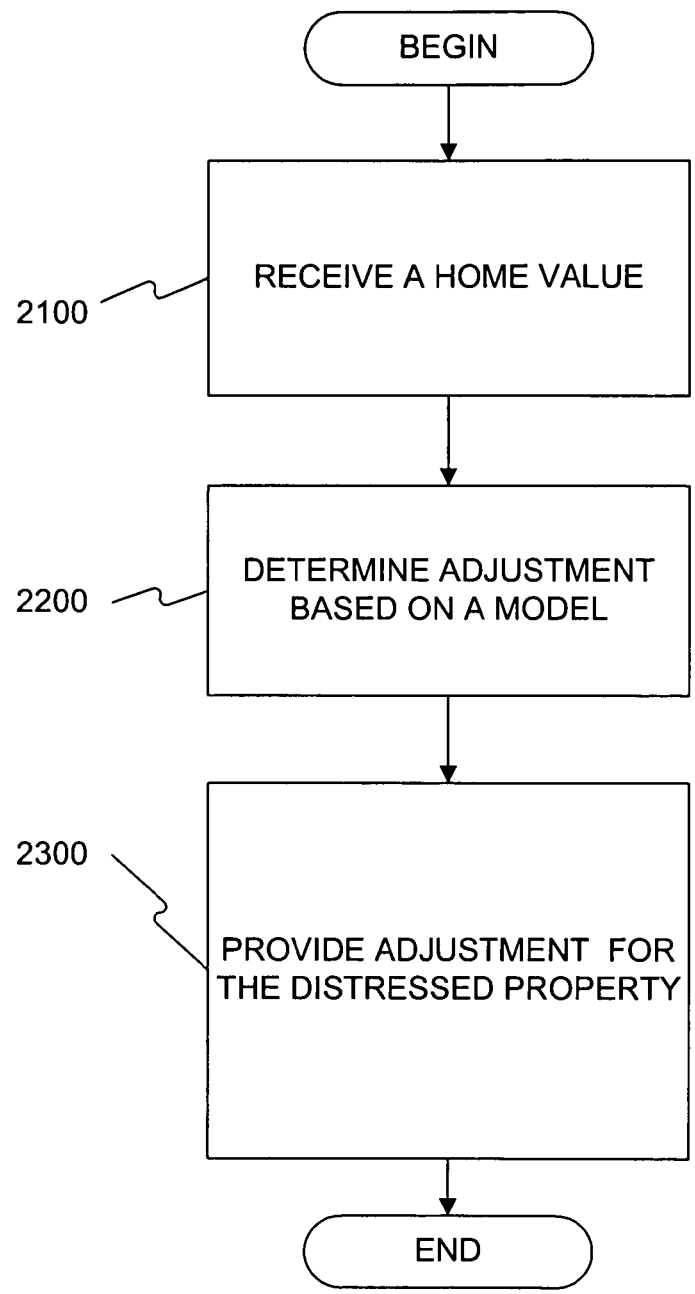
FIG. 2 is an exemplary flowchart for providing a value adjustment consistent with the systems and methods of the present invention.

FIG. 2 depicts a flow chart with steps for providing a value adjustment for a mortgaged property that is in a foreclosure status or a delinquent status. Referring to FIGS. 1 and 2, processor 1350 receives from information sources 1800 an estimate of value that has not been adjusted to reflect the distressed condition of the property (step 2100). For example, given a property address, an AVM can provide an estimate of the property's value. In some cases, the AVM estimate of home value also includes a standard deviation, which represents the expected amount of error associated with the model used in the AVM, and prior home value estimates. Processor 1350 also receives information about the property, mortgage loan, and/or borrower from information sources 1800. Next, processor 1350 determines a value adjustment based on a model, an example of which is described below with respect to FIGS. 5 and 6 (step 2200). The model may account for a variety of factors concerning the loan, the property (e.g., property address), and/or the borrower to determine a value adjustment for the distressed property. Processor 1350 may then provide the value adjustment for the distressed property (step 2300). The adjustment may be in terms of a dollar reduction/increase to the value estimate received in step 2100 (e.g., reduce $10,000 from estimate received in step 2100), a percentage reduction/increase to the value adjustment received in step 2100 (e.g., reduce estimate received in step 2100 by 10%), or an estimate of value (e.g., an adjusted value of $90,000). In the case of a mortgaged property that is in foreclosure, a lender (e.g., lender 1500) may use the adjusted value to help them set a market or sales price for the distressed property. In the case of a mortgage having delinquent or seriously delinquent mortgage payments, lender 1500 may, based on the adjustment, offer a modification to the terms of the mortgage and to the corresponding monthly payments in an effort to reduce the likelihood of a foreclosure—an outcome that is undesirable for both the lender and the borrower.

Figure 3:
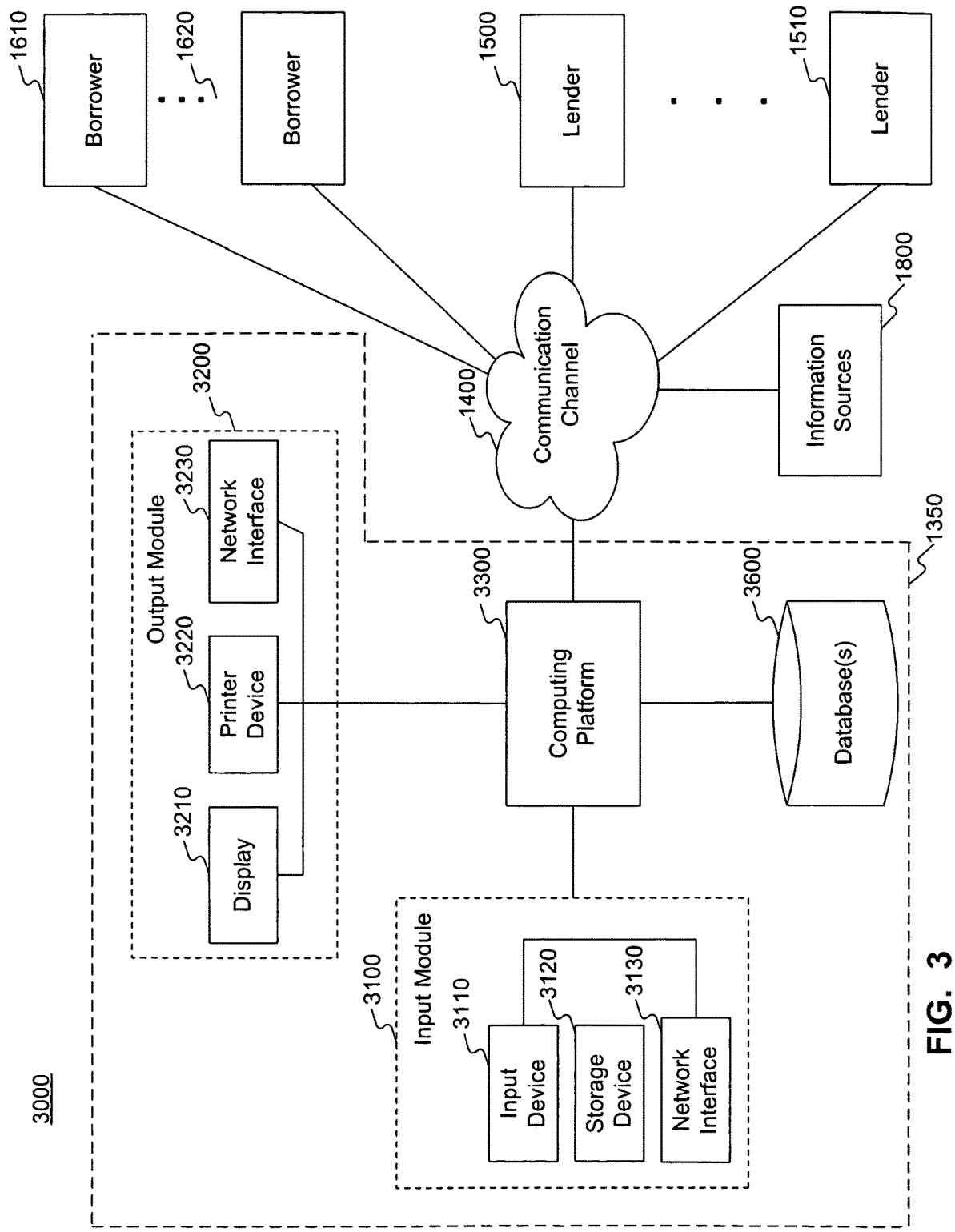
FIG. 3 illustrates another exemplary system environment consistent with the systems and methods of the present invention.

FIG. 3 illustrates another exemplary system environment 3000 consistent with the systems and methods of the present invention. As illustrated in FIG. 3, the system environment 3000 includes a processor 1350, one or more lenders 1500, 1510, one or more borrowers 1610, 1620, information sources 1800, and a communication channel 1400. The processor 1350 may also include an input module 3100, an output module 3200, a computing platform 3300, and one or more databases 3600. Although processor 1350 is depicted as separate from lenders 1500, 1510, processor 1350 may be located anywhere.

In one embodiment consistent with FIG. 3, computing platform 3300 may include a data processor such as a PC, UNIX server, or mainframe computer for performing various functions and operations. Computing platform 3300 may be implemented, for example, by a general purpose computer or data processor selectively activated or reconfigured by a stored computer program, or may be a specially constructed computing platform for carrying-out the features and operations disclosed herein. Moreover, computing platform 3300 may be implemented or provided with a wide variety of components or systems including, for example, one or more of the following: a central processing unit, a co-processor, memory, registers, and other data processing devices and subsystems.

Communication channel 1400 may include, alone or in any suitable combination of a telephony-based network, a local area network (LAN), a wide area network (WAN), a dedicated intranet, the Internet, a wireless network, bus, or a wireless connection. Further, any suitable combination of wired and/or wireless components and systems may be incorporated into communication channel 1400. Although the computing platform 3300 may connect to the lenders 1500, 1510 through the communication channel 1400, computing platform 3300 may connect directly to lenders 1500, 1510.

Computing platform 3300 also communicates with input module 3100 and/or output module 3200 using connections or communication links, as illustrated in FIG. 3. Alternatively, communication between computing platform 3300 and input module 3100 or output module 3200 may be achieved using a network (not shown) similar to that described above for communication channel 1400. A skilled artisan would recognize that computing platform 3300 may be located in the same location or at a geographical separate location from input module 3100 and/or output module 3200 by using dedicated communication links or a network.

Input module 3100 may be implemented with a wide variety of devices to receive and/or provide information. Referring to FIG. 3, input module 3100 may include an input device 3110, a storage device 3120, and/or a network interface 3130. Input device 3110 may also include a keyboard, a mouse, a disk drive, telephone, or any other suitable input device for receiving and/or providing information to computing platform 3300. Although FIG. 3 only illustrates a single input module 3100, a plurality of input modules 3100 may also be used.

Storage device 3120 may be implemented with a wide variety of systems, subsystems, and/or devices for providing memory or storage including, for example, one or more of the following: a read-only memory (ROM) device, a random access memory (RAM) device, a tape or disk drive, an optical storage device, a magnetic storage device, a redundant array of inexpensive disks (RAID), and/or any other device capable of providing storage and/or memory.

Network interface 3130 may exchange data between communication channel 1400 and computing platform 3300 and may also exchange data between input module 3100 and computing platform 3300. In one aspect of the invention, network interface 3130 may permit a connection to at least one or more of the following networks: an Ethernet network, an Internet protocol network, a telephone network, a radio network, a cellular network, a cable network, or any other network capable of being connected to input module 3100.

Output module 3200 may include a display 3210, a printer 3220, and/or a network interface 3230. Output module 3200 may be used to provide, inter alia, an amount indicative of the adjusted value associated with the distressed property. Further, the output from computing platform 3300 may be displayed or viewed through display 3210 (e.g., a cathode ray tube or liquid crystal display) and/or printer device 3220. For example, the adjusted value may be viewed on display 3210 and/or printed on printer device 3220. Although FIG. 3 only illustrates a single output module 3200, a plurality of output modules 3200 may be used.

Network interface 3230 exchanges data between the output module 3200 and computing platform 3300 and/or between computing platform 3300 and the communication channel 1400. Network interface 3230 may permit connection to at least one or more of the following networks: an Ethernet network, and Internet protocol network, a telephone network, a cellular network, a radio network, a cable network, or any other network capable of being connected to output module 3200.

Database 3600 may store information including financial information, demographic information, real estate information, credit information, loan application information, and other public and/or proprietary information. For example, database 3600 may store information received from information sources 1800 such as information from DataQuick Information Systems, International Data Management Inc., First American Corporation, county property and/or tax records, TransUnion LLC, Equifax Inc., Experian, Acxiom, Department of Commerce, and Bureau of Labor and Statistics. Moreover, database 3600 may store demographic information associated with a property, such as a median or average property value in the neighborhood or region associated with the property, and/or a property value or property value growth rate with respect to previous periods. Although database 3600 is shown in FIG. 3 as being connected to computing platform 3300, a skilled artisan would recognize that database 3600 may be located anywhere (or in multiple locations) and connected to computing platform 3300 via direct links or networks.

Figure 4:
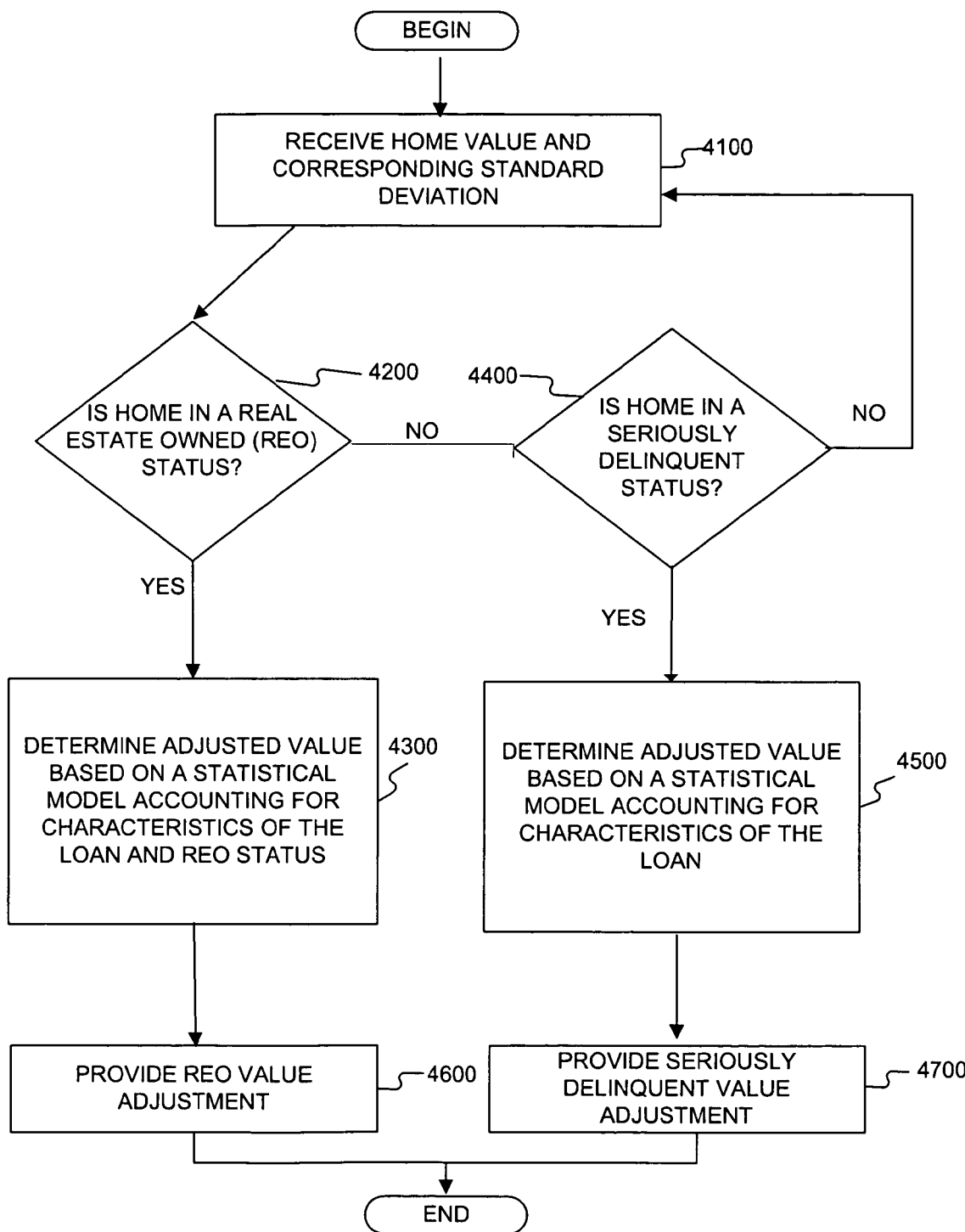
FIG. 4 is another exemplary flowchart for providing value adjustments consistent with the systems and methods of the present invention.

FIG. 4 shows another exemplary flowchart with steps for providing a value adjustment for a distressed property. Referring to FIGS. 3 and 4, computing platform 3300 may receive for the property a home value estimate and/or a corresponding standard deviation for that estimate (step 4100). Computing platform 3300 may then determine whether the property is in REO status (i.e., in foreclosure) (step 4200). If in foreclosure, computing platform 3300 may determine an adjusted value based on a model (also referred to as a statistical model) that accounts for characteristics of the loan (e.g., loan type), the property (including, e.g., a property address, a home value estimate and average/median home prices in the neighborhood), the borrower (e.g., credit history), and/or the REO status (yes at step 4200 and step 4300). Computing platform 3300 may then provide an adjusted value for the REO property (step 4600). If not REO, computing platform 3300 may determine whether the home mortgage has payments that are seriously delinquent (no at step 4200 and step 4400). If the home is not in REO status and its mortgage does not have seriously delinquent payments (no at steps 4200 and 4400), computing platform 3300 returns to step 4100. When in the seriously delinquent status, computing platform 3300 may determine an adjusted value based on a statistical model that accounts for characteristics of the loan, the property, and the borrower (yes at step 4400 and step 4500). Computing platform 3300 may then provide an adjusted value for the property having a mortgage in a seriously delinquent status (step 4700). With the above description of the flowchart of FIG. 4, the following describes additional exemplary details of steps 4100-4700.

To receive a home value estimate and/or corresponding standard deviation of the property (step 4100), computing platform 3300 may receive a value estimate of the property. In some embodiments, the value estimate is received from an AVM, although any mechanism for providing an indication of the value of the property securing the mortgage could be used instead. Moreover, the value estimate may include the value of the property when the mortgage was originated and/or when the mortgage was considered to be in a foreclosure status or in a delinquent status. In some embodiments, the value estimate is received from information sources 1800 including, for example, Freddie Mac's Home Value Explorer and/or database 3600. However, the value estimate in step 4100 (e.g., received from an AVM) has not yet been adjusted to account for foreclosure or delinquency.

To determine whether the property is in REO status (step 4200), computing platform 3300 receives an indication from the lender. For example, lender 1500 may send a property address to computing platform 3300 with an indication (e.g., a flag, message, or data field) that the property is REO by the lender. In other cases, lender 1500 may send the property address, the indication, and/or other information associated with the borrower (e.g., income, credit history, and/or credit score) and the corresponding mortgage loan information (e.g., mortgage loan application information, mortgage payment history, and mortgage type).

Figure 5:
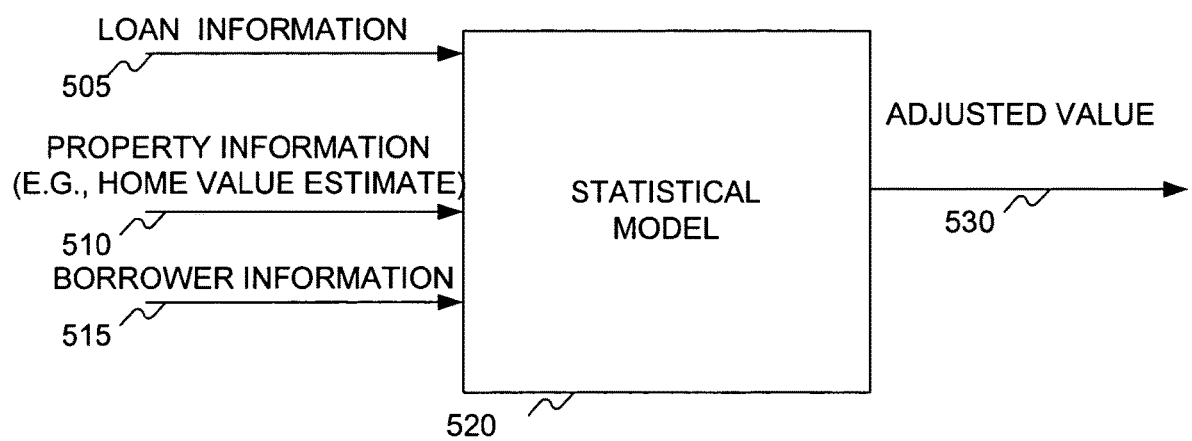
FIG. 5 illustrates exemplary model consistent with the systems and methods of the present invention.

To determine an adjusted value of the property, computing platform 3300 uses the home value estimate of the distressed property and any other information required by the statistical model that accounts for characteristics of the loan, the property (including, e.g., a home value estimate for the property and a median home value for the corresponding neighborhood), the borrower, and/or the REO status (yes at step 4200 and step 4300). FIG. 5 depicts a block diagram including an exemplary statistical model 520. Referring to FIG. 5, statistical model 520 receives one or more inputs, such as loan information 505, property information 510 (e.g., a home value estimate), and borrower information 515 to determine an output, such as an adjusted value 530. As used herein, a "model" means a mathematical description used to determine a desired output based on one or more inputs. As used herein, the phrase "statistical model" refers to a model that uses statistical techniques.

Referring again to FIG. 4, to provide the adjustment for the REO property (step 4600), computing platform 3300 may send to a lender (e.g., lender 1500) the value adjustment in the form of an amount indicative of the discount to the outstanding mortgage balance owed by the borrower. For example, if the mortgage was foreclosed with $100,000 remaining on the mortgage, the adjusted value may indicate that the distressed property has an "adjusted market value" of $80,000—the adjustment taking into account a variety of factors, not solely the fact that the property is in foreclosure. In this case, lender 1500 may decide to list the property for $80,000 to maximize sale price while minimizing time-on-market and risk of over overpricing the property. While comparable non-REO properties may sell for $100,000, this property would sit on the market at that price, due to the stigma attached to foreclosed properties, and likely repair and other problems it has suffered from neglect while the loan was moving through foreclosure. Although the previous example describes value adjustments in terms of dollars, any indication of value may be used instead. Returning to the previous example, the adjustment may be expressed as percentage, such as 20% (equivalent to the $80,000 adjusted value described in the example above).

To determine whether the home has a mortgage in a seriously delinquent status (no at step 4200 and step 4400), computing platform 3300 may receive an indication from the lender associated with the mortgage. For example, lender 1500 may send a property address to computing platform 3300 with an indication (e.g., a flag, message, or data field) that the loan on the property is 90 days past due. For example, lender 1500 may send along with the property address, the number of late payments (or months) that the mortgage is delinquent. Alternatively, lender 1500 may simply send an indication that the mortgage is delinquent or seriously delinquent. As noted above, lender 1500 may also send the property address, the indication, and other information associated with the borrower, property, and/or the mortgage loan.

To determine an adjusted value based on a statistical model that accounts for characteristics of the loan, the property, and the borrower (yes at step 4400 and step 4500), computing platform 3300 uses the initial home value estimate of the distressed property and any other information required by the model, such as loan information (e.g., loan application information, type of mortgage, mortgage purpose, payment history, REO status, or delinquent status), property information (e.g., home value estimate and corresponding standard deviation, prior sales value or estimated value for the property at loan origination or other time, demographics concerning property values in neighborhood and quarterly change to such values, property type, and property address), and/or borrower information (e.g., income, credit score, and credit history) to calculate the adjusted value. In some embodiments, two different models are used, one for seriously delinquent mortgages (step 4500) and another model for mortgages where the underlying property is REO (step 4300). Alternatively, a single model may be used for steps 4300 and 4500 with the model adding an additional value adjustment corresponding to the REO status of step 4300, e.g., by increasing any determined price adjustment by an additional amount to account for foreclosure. As noted above, FIG. 5 is an exemplary statistical model 520 which can be used as a model for step 4300 or, alternatively, for step 4500 with REO status being input to the model as loan information.

To provide an adjusted value for the home having a mortgage that is in a delinquent status or in a seriously delinquent status (step 4700), computing platform 3300 may send to lender 1500 and/or borrower 1610 the adjusted value in the form of an amount indicative of the discount to the outstanding mortgage. For example, a 30-year mortgage with $100,000 outstanding balance would have a monthly principal and interest (P&I) payment of $599 at 6% interest. If that borrower is seriously delinquent, the adjusted value provided to a lender may indicate that the property collateralizing that mortgage has an adjusted value of $90,000. In this example, the lender could decide that the loss it would take on the property from foreclosing on the loan is great enough that it will adjust the terms of the loan to lower the interest rate on the loan to 5%, extending the term, and offering other adjustments such that the payments are brought back to current, and the monthly P&I falls to $500. Such changes in the terms of the mortgage will increase the likelihood that the borrower would make timely payments on the mortgage loan, thus avoiding foreclosure and the almost sure loss to the lender of $10,000 from the property value decline below loan balance as well as the loss of loan interest.

In some cases, the adjusted value may indicate that the distressed property has a value greater than the amount outstanding on the loan. Returning to the above example of a 30-year mortgage with $100,000 outstanding balance, the adjusted value may show that the distressed property now has a value of $150,000. If the borrower is seriously delinquent, the lender could adjust one or more terms of the mortgage, which might increase the likelihood that the borrower could make timely payments on the loan. But, in this case, the lender would not need to lower the interest rate or take some loss now, since the lender is unlikely to face much loss if the mortgage forecloses and the lender acquires the property. These examples show that the distressed values provided by the invention can help the lender better manage its risk from seriously delinquent loans. The adjusted value statistically derived from the automated property value along with the other information about the property, loan, and borrower improve the model's estimate to reduce the lender's risk and raise profitability.

Figure 6:
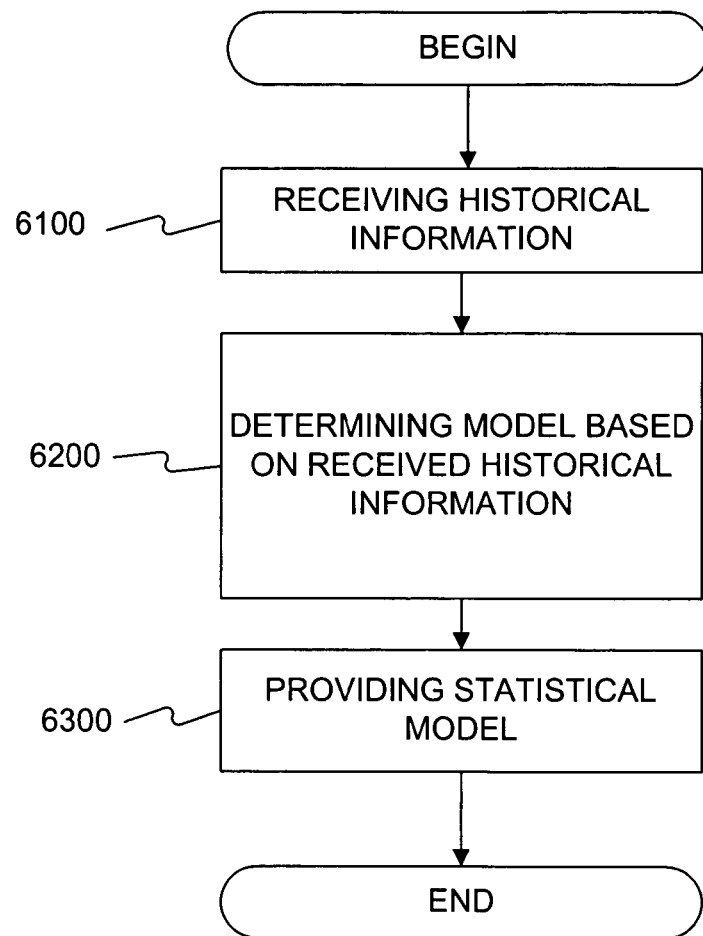
FIG. 6 depicts an exemplary flowchart for determining a model consistent with the systems and methods of the present invention.

FIG. 6 is a flowchart with exemplary steps for determining a statistical model. Referring to FIG. 6, computing platform 3300 may receive historical information for one or more mortgages having payments that were previously delinquent and/or in foreclosure (step 6100). Moreover, the historical information for mortgages includes the adjusted value used for the sale of the property (or appraisal, broker price opinion, or original sales price in the delinquent status case) as well as loan information 505, property information 510, and/or borrower information 515. A skilled artisan would recognize that such historical information is also referred to as "truth" data used to determine the model. Computing platform 3300 then determines the statistical model 520 based on the received information. In some embodiments, the model can be determined before it is used in connection with FIGS. 2 and 4. Moreover, computing platform 3300 may provide statistical model 520 to database 3600 for later use when determining value adjustments or, alternatively, provide the determined statistical model 520 to any financial entity seeking to determine value adjustments for distressed properties. As such, the model can be determined once based on historical information (such as loan, borrower, and property information as well as REO sales information and any mortgage balance reduction information), so that model 520 can be used many times with any other loans for which a value adjustment is desired.

To receive historical information for one or more mortgage loans that were in a previously delinquent status and/or in a foreclosure status (step 6100), the computing platform 3300 may receive historical information for the loans from sources of information, such as database 3600 or information sources 1800. The historical information may include borrower information (e.g., income, credit score, and/or credit history), loan information (e.g., loan application information; loan type, such as fixed, adjustable; loan purpose, such as cash-out, refinance, or purchase; payment history; REO status; and/or delinquency status), and/or property information (e.g., property address, home value estimate, standard deviation, average/median price of comparable home, growth to home price when compared to a previous quarter, and/or estimated property value at an earlier time such as loan origination).

Moreover, the historical information may include information that is considered reliable and verified (e.g., "truth" data). Although unverified information can be used, the accuracy of the model determined in step 6200 may be improved by using data with reliable value adjustment information and loan information.

In one aspect of the invention, computing platform 3300 may also receive from database 3600 or information sources 1800 one or more of the following information that may serve as historical information: borrower credit information (e.g., credit history); a credit score; a credit card balance; a credit card limit; a ratio of a credit card balance to a credit card limit; a borrower's mortgage loan size; a borrower's car loan size; a borrower's delinquencies, such as 30, 60, or 90-day delinquencies (e.g., past due payments on debt); the initiation date of foreclosure proceedings; a median (or average) income for a region, such as a street, a neighborhood, a city, a ZIP code, a county, a state, a country, a census tract, and/or a metropolitan statistical area; an indication of whether the borrower is a first time home buyer; a loan purpose, such as whether the loan is for a purchase, a refinance, a cash-out refinance, or a second lien; a loan-to-value ratio for borrower's mortgage loan; a total loan-to-value ratio of all loans secured by the property; a borrower's current home value; an estimated value as of the loan origination date; an indication of whether the mortgage loan is secured by a condominium, a single family home, a townhouse, a 2-4 unit dwelling, a multifamily dwelling, a home in a planned community, or manufactured housing; number of wage earners in the borrower's household; number of co-borrowers; a number indicating the quantity of residential units on a property; and/or any other information that could impact a property value. Moreover, computing platform 3300 may receive the historical information for a plurality of past loans.

To determine statistical model 520 based on the received information (step 6200), the computing platform 3300 may process the historical information received in step 6100 based on statistical techniques, such as a least squared error approach. The least square error approach is known and is described in many textbooks including the textbook titled Econometric Methods by J. Johnston (3rd Edition 1984). Specifically, to determine the model, computing platform 3300 determines the coefficients of the model based on the received historical information that includes known values.

In one embodiment, computing platform 3300 uses a model based on the following equation:

$$\ln BPO_i = b_o + \sum_{j=1}^{k} b_j X_{ji} + e_i$$

where BPO corresponds to adjusted value for the distressed property; ln BPO represents the natural log of that value; $b_0$ corresponds to an intercept term; $b_j$ corresponds to coefficients of the model; $X_j$ corresponds to variables used in the model; $e_i$ corresponds to the model error term; i corresponds to the $i^{th}$ loan in the received historical information having n loans total; and j represents the $j^{th}$ coefficient for j equal to 1 to k.

As noted above, the historical information may include loans (e.g., n loans) having information concerning the property, loan, and/or borrower. For example, the historical information may include one or more of the following: unpaid principal balance (UPB) of the mortgage; loan to value (LTV) ratio; total LTV of all mortgages on the property; loan purpose (e.g., a flag or value indicative of whether the mortgage is for a refinance, cash-out refinance, or a purchase); home value information (e.g., a home value estimate, an automated home value estimate (AVM) at origination of the mortgage purchasing the property, any difference between the mortgage origination value and an automated home value estimate (AVM) determined retrospectively for the origination of the mortgage, a median property value in a region associated with the distressed property, and any changes to median and/or average property values in the region with respect to a previous quarter); property type (e.g., condominium, co-op, single family home, manufactured housing, etc.); amount of time since mortgage origination; REO status; and any other information that may be indicative of the adjusted value of a property that is distressed. One or more of the aforementioned historical information can be associated with a coefficient $b_j$ in the statistical model.

Referring to the above equation, since BPO (historical, known adjusted sales price, appraisal, or broker price opinion) and the variables $X_j$ are known for all of the mortgages included in the historical information received in step 6100, computing platform 3300 may determine the unknown coefficients $b_j$ using known statistical techniques, such as a least squares regression, or variant such as weighted least squares regression. Once the model coefficients $b_j$ are determined based on the historical information, model 520 has been determined and may then be provided for later use (step 6300).

Once the model is determined, computing platform 3300 uses the determined coefficients $b_j$ to process any mortgage loans. Specifically, when a home value is received in step 4100 and the property is REO (steps 4100 and yes at step 4200), computing platform 3300 may use the received home value estimate and multiply that value by the corresponding coefficient $b_j$. Moreover, any other information received in step 4100 can be treated as a variable $X_j$ and multiplied by a corresponding coefficient $b_j$ in the statistical model, such that the adjusted value (labeled BPO) is determined for that mortgage.

By way of example, steps 6100-6300 may yield the following model:

TABLE 1

Exemplary Model

| | |
|---|---|
| 1 | ln (BP0) |
| 2 | = 0.68   \* intercept *\ |
| 3 | +0.94* ln (HVE)   \*natural log of HVE as of BPO date*\ |
| 4 | + 0.36*COUNTY_INCOME \*natural log of median income in property's ZIP *\) |
| 5 | +404.12*GROWTH   \*negative growth in property values from quarter before BPO *\ |
| 6 | −0.146*NCOREFI   \*cash out refinance flag *\ |
| 7 | +0.06*HVEORIGPRCN)   \*standardized difference between HVE value at loan origination and given origination value *\ |

Referring to Table 1 above, the model coefficients are +0.68, +0.94, +0.36, +404.12, −0.146, and +0.06. Each coefficient corresponds to a variable, such as HVE information received in step 4100 and/or other information associated with the loan, borrower, or property. Referring again to Table 1, the received natural log of HVE is multiplied by the coefficient 0.94 (line 3). Computing platform 3300 then multiplies the coefficient 0.36 by the median ZIP income (in dollars) for the ZIP code region associated the distressed property (line 4). In addition, computing platform 3300 multiplies coefficient 404.12 by the rate of growth in property values in the ZIP code for the property in the quarter before the broker price opinion (e.g., a 2% decrease in house price values in the ZIP of the property when compared to the previous 3 month period) (line 5). In addition, computing platform 3300 multiples the coefficients −0.146 by a flag that indicates whether the buyer of the original mortgage received cash as part of a cash-out refinancing (line 6), and multiples the coefficient 0.06 by the standardized difference between the home value estimate at origination (e.g., a retrospective HVE) of the loan and the origination value (e.g., sales price or appraisal value) of the loan (line 7). Computing platform 3300 then sums row 2 with the determined products of rows 3-7. Computing platform 3300 then exponentiates that sum to determine the BPO, i.e., the adjusted value.

In some embodiments, to determine a home value estimate at origination a retrospective HVE is used, as described in U.S. patent application Ser. No. 10/679,516, filed Oct. 7, 2003, titled "Systems and Methods for Retrospective Home Value Scoring," which is incorporated by reference in its entirety.

The coefficients listed in Table 1 (e.g., HVE, COUNTY_INCOME, GROWTH, NCOREF, and HVEORIGPRCN) are only exemplary since other coefficients may be determined during steps 6100-6300 and then used to determine the adjusted value of the distressed property. Moreover, the use of 5 coefficients in Table 1 is only exemplary since any number may be used.

The systems herein may be embodied in various forms including, for example, a data processor, such as the computer that also includes a database. Moreover, the above-noted features and other aspects and principles of the present invention may be implemented in various environments. Such environments and related applications may be specially constructed for performing the various processes and operations of the invention or they may include a general-purpose computer or computing platform selectively activated or reconfigured by code to provide the necessary functionality. The processes disclosed herein are not inherently related to any particular computer or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Systems and methods consistent with the present invention also include computer readable media that include program instruction or code for performing various computer-implemented operations based on the methods and processes of the invention. The media and program instructions may be those specially designed and constructed for the purposes of the invention, or they may be of the kind well known and available to those having skill in the computer software arts. Examples of program instructions include machine code, such as produced by a compiler, and files containing a high level code that can be executed by the computer using an interpreter.

Furthermore, although the embodiments above refer to processing information related to mortgage loans secured by improved real property, systems and methods consistent with the present invention may process information related to other types of loans or credit instruments, including those secured by property, such as automobiles and/or personal property.

What is claimed is:

1. A computer-implemented method executed by a data processor connected to a networked database through a network interface, the method comprising:
receiving, by the data processor via the network interface, a user request to calculate an adjustment to an estimate of value of a property, wherein the received request activates code for determining a calculated adjustment to the estimate of value of the property;
receiving, by the data processor via the network interface, an indication of current distress for the property for which there is a corresponding existing loan, the indication of distress indicating a foreclosure status of the property or indicating that one or more payments for the existing loan are overdue;
receiving, by the data processor via the network interface, first data including the estimate of value for the property;
receiving, by the data processor via the network interface, second data including an outstanding mortgage balance for the corresponding existing loan, the second data being different from the first data;
selecting, using the data processor, a first model for seriously delinquent loans and a second model for mortgages where the underlying property is in Real Estate Owned (REO) status, wherein variables of the first model and the second model are based on the first data and the second data, wherein coefficients of the first model are based on historical information on one or more mortgage loans that were previously in delinquent status, and wherein coefficients of the second model are based on historical information on one or more properties that were previously in REO status;
responsive to a determination by the data processor that the property has a seriously delinquent loan, calculating, by the data processor via the network interface, the adjustment to the estimate of value based on the first model, wherein the calculated adjustment is derived from a function of one or more of: delinquent status, loan application information, type of mortgage, mortgage purpose, payment history, home value estimate and corresponding standard deviation, prior sales value, estimated value for the property, demographics concerning property values in neighborhood, quarterly change to such values, property type, property address, borrower's income, borrower's credit score, and borrower's credit history;
responsive to a determination by the data processor that the property is in REO status, calculating, by the data processor via the network interface, the adjustment to the estimate of value based on the second model, wherein the calculated adjustment is derived from a function of one or more of: REO status, loan application information, type of mortgage, mortgage purpose, payment history, home value estimate and corresponding standard deviation, prior sales value, estimated value for the property, demographics concerning property values in neighborhood, quarterly change to such values, property type, property address, borrower's income, borrower's credit score, and borrower's credit history;
transmitting, via the network interface, the calculated adjustment to the estimate of value for display on a client terminal, wherein, if the property has a seriously delinquent loan, the transmitted calculated adjustment activates code for converting the calculated adjustment to the estimate of value into an amount indicative of the discount to the outstanding mortgage loan; and
creating, via the network interface, in response to the user request, a web page displaying the calculated adjustment to the estimate of value of the property and, if the property has a seriously delinquent loan, the amount indicative of the discount to the outstanding mortgage loan.

2. The method of claim 1, wherein calculating the adjustment to the estimate of value further comprises increasing any determined price adjustment by an additional amount to account for changes in the current distress status.

3. The method of claim 1, further comprising:
storing, using the data processor, the adjustment.

4. The method of claim 1, further comprising:
determining, using the data processor, when the indication of current distress indicates that one or more payments for the existing loan are overdue, whether to modify one or more terms of the existing loan based on the adjustment.

5. The method of claim 4, wherein the one or more terms of the existing loan comprises a length of the loan, an interest rate of the loan, or an adjustment that modifies a periodic payment on the loan.

6. The method of claim 1, further comprising:
determining, using the data processor, the first data utilizing an automated valuation model.

7. The method of claim 6, further comprising:
receiving, by the data processor, a standard deviation associated with the automated valuation model.

8. The method of claim 1, further comprising:
receiving, by the data processor, a comparison of a purchase price or appraised value at loan origination with an as-of-origination estimated value of the property.

9. The method of claim 1, wherein calculating the adjustment includes accounting for a characteristic of one of a borrower, the existing loan, and the property.

10. A non-transitory computer-readable storage medium comprising instructions which, when executed by a computing platform connected to a data processor and at least one networked database through a network interface, perform a method comprising:
receiving, by the data processor via the network interface, a user request to calculate an adjustment to an estimate of value of a property, wherein the received request activates code for determining a calculated adjustment to the estimate of value of the property;

receiving, by the data processor via the network interface, an indication of current distress for the property for which there is a corresponding existing loan, the indication of distress indicating a foreclosure status of the property or indicating that one or more payments for the existing loan are overdue;

receiving, by the data processor via the network interface, first data including the estimate of value for the property;

receiving, by the data processor via the network interface, second data including an outstanding mortgage balance for the corresponding existing loan, the second data being different from the first data;

selecting, using the data processor, a first model for seriously delinquent loans and a second model for mortgages where the underlying property is in REO status, wherein variables of the first model and the second model are based on the first data and the second data, wherein coefficients of the first model are based on historical information on one or more mortgage loans that were previously in delinquent status, and wherein coefficients of the second model are based on historical information on one or more properties that were previously in REO status;

responsive to a determination by the data processor that the property has a seriously delinquent loan, calculating, by the data processor via the network interface, the adjustment to the estimate of value based on the first model, wherein the calculated adjustment is derived from a function of one or more of: delinquent status, loan application information, type of mortgage, mortgage purpose, payment history, home value estimate and corresponding standard deviation, prior sales value, estimated value for the property, demographics concerning property values in neighborhood, quarterly change to such values, property type, property address, borrower's income, borrower's credit score, and borrower's credit history;

responsive to a determination by the data processor that the property is in REO status, calculating, by the data processor via the network interface, the adjustment to the estimate of value based on the second model, wherein the calculated adjustment is derived from a function of one or more of: REO status, loan application information, type of mortgage, mortgage purpose, payment history, home value estimate and corresponding standard deviation, prior sales value, estimated value for the property, demographics concerning property values in neighborhood, quarterly change to such values, property type, property address, borrower's income, borrower's credit score, and borrower's credit history;

transmitting, via the network interface, the calculated adjustment to the estimate of value for display on a client terminal, wherein, if the property has a seriously delinquent loan, the transmitted calculated adjustment activates code for converting the calculated adjustment to the estimate of value into an amount indicative of the discount to the outstanding mortgage loan; and creating, via the network interface, in response to the user request, a web page displaying the calculated adjustment to the estimate of value of the property and, if the property has a seriously delinquent loan, the amount indicative of the discount to the outstanding mortgage loan.

11. The non-transitory computer-readable storage medium of claim 10, wherein calculating the adjustment to the estimate of value further comprises increasing any determined price adjustment by an additional amount to account for changes in the current distress status.

12. The non-transitory computer-readable storage medium of claim 10, further comprising:
storing, using the data processor, the adjustment in the at least one networked database.

13. The non-transitory computer-readable storage medium of claim 10, further comprising:
determining, using the data processor, when the indication of current distress indicates that one or more payments for the existing loan are overdue, whether to modify one or more terms of the existing loan based on the adjustment.

14. The non-transitory computer-readable storage medium of claim 13, wherein the one or more terms of the existing loan comprises a length of the loan, an interest rate of the loan, or an adjustment that modifies a periodic payment on the loan.

15. The non-transitory computer-readable storage medium of claim 10, wherein the method further comprises:
determining, using the data processor, the first data utilizing an automated valuation model.

16. The non-transitory computer-readable storage medium of claim 15, the method further comprising:
receiving, by the data processor, a standard deviation associated with the automated valuation model.

17. The non-transitory computer-readable storage medium of claim 10, the method further comprising:
receiving, by the data processor, a comparison of a purchase price or appraised value at loan origination with an as-of-origination estimated value of the property.

18. The non-transitory computer-readable storage medium of claim 10, wherein calculating the adjustment includes accounting for a characteristic of one of a borrower, the existing loan, and the property.

19. A system comprising:
at least one data processor connected to a networked database through a network interface; and
a memory device storing instructions which configure the at least one data processor to:
receive, via the network interface, a user request to calculate an adjustment to an estimate of value of a property, wherein the received request activates code for determining a calculated adjustment to the estimate of value of the property;
receive, via the network interface, an indication of current distress for the property for which there is a corresponding existing loan, the indication of distress indicating a foreclosure status of the property or indicating that one or more payments for the existing loan are overdue;
receive, via the network interface, first data including the estimate of value for the property;
receive, via the network interface, second data including an outstanding mortgage balance for the corresponding existing loan, the second data being different from the first data;
select a first model for seriously delinquent loans and a second model for mortgages where the underlying property is in REO status, wherein variables of the first model and the second model are based on the first data and the second data, wherein coefficients of the first model are based on historical information on one or more mortgage loans that were previously in delinquent status, and wherein coefficients of the second model are based on historical information on one or more properties that were previously in REO status;

responsive to a determination by the data processor—that the property has a seriously delinquent loan, calculate, via the network interface, the adjustment to the estimate of value based on the first model, wherein the calculated adjustment is derived from a function of one or more of: delinquent status, loan application information, type of mortgage, mortgage purpose, payment history, home value estimate and corresponding standard deviation, prior sales value, estimated value for the property, demographics concerning property values in neighborhood, quarterly change to such values, property type, property address, borrower's income, borrower's credit score, and borrower's credit history;

responsive to a determination by the data processor—that the property is in REO status, calculate, via the network interface, the adjustment to the estimate of value based on the second model, wherein the calculated adjustment is derived from a function of one or more of: REO status, loan application information, type of mortgage, mortgage purpose, payment history, home value estimate and corresponding standard deviation, prior sales value, estimated value for the property, demographics concerning property values in neighborhood, quarterly change to such values, property type, property address, borrower's income, borrower's credit score, and borrower's credit history;

transmit, via the network interface, the calculated adjustment to the estimate of value for display on a client terminal, wherein, if the property has a seriously delinquent loan, the transmitted calculated adjustment activates code for converting the calculated adjustment to the estimate of value into an amount indicative of the discount to the outstanding mortgage loan; and create, via the network interface, in response to the user request, a web page displaying the calculated adjustment to the estimate of value of the property and, if the property has a seriously delinquent loan, the amount indicative of the discount to the outstanding mortgage loan.

20. The system of claim 19, wherein calculating the adjustment to the estimate of value further comprises increasing any determined price adjustment by an additional amount to account for changes in the current distress status.

21. The system of claim 19, wherein the memory and the at least one data processor are further configured to implement operations comprising:
storing the adjustment.

22. The system of claim 19, wherein the memory and the at least one data processor are further configured to implement operations comprising:
determining, when the indication of current distress indicates that one or more payments for the existing loan are overdue, whether to modify one or more terms of the existing loan based on the adjustment.

23. The system of claim 22, wherein the one or more terms of the existing loan comprises a length of the loan, an interest rate of the loan, or an adjustment that modifies a periodic payment on the loan.

24. The system of claim 19, wherein the memory and the at least one data processor are further configured to implement operations comprising:
determining the first data utilizing an automated valuation model.

25. The system of claim 24, wherein the memory and the at least one data processor are further configured to implement operations comprising:
receiving a standard deviation associated with the automated valuation model.

26. The system of claim 19, wherein the memory and the at least one data processor are further configured to implement operations comprising:
receiving a comparison of a purchase price or appraised value at loan origination with an as-of-origination estimated value of the property.

27. The system of claim 19, wherein calculating the adjustment includes accounting for a characteristic of one of a borrower, the existing loan, and the property.

* * * * *

UNITED STATES PATENT AND TRADEMARK OFFICE
CERTIFICATE OF CORRECTION

PATENT NO. : 10,664,908 B1
APPLICATION NO. : 15/723017
DATED : May 26, 2020
INVENTOR(S) : Gordon et al.

Page 1 of 1

It is certified that error appears in the above-identified patent and that said Letters Patent is hereby corrected as shown below:

In the Claims

Claim 19, Column 17, Lines 4-5, "processor—that" should read as --processor that--.

Claim 19, Column 17, Lines 18-19, "processor—that" should read as --processor that--.

Signed and Sealed this
Twentieth Day of October, 2020

Andrei Iancu
*Director of the United States Patent and Trademark Office*